(12) United States Patent
Oh et al.

(10) Patent No.: US 10,734,651 B2
(45) Date of Patent: Aug. 4, 2020

(54) LITHIUM SECONDARY BATTERY AND BINDER FOR ANODE OF THE LITHIUM SECONDARY BATTERY

(71) Applicants: HYUNDAI MOTOR COMPANY, Seoul (KR); KIA MOTORS CORPORATION, Seoul (KR); INCHEON UNIVERSITY INDUSTRY ACADEMIC COOPERATION FOUNDATION, Incheon (KR)

(72) Inventors: Seung-Min Oh, Incheon (KR); Yeolmae Yeo, Anseong-si (KR); KiSeok Koh, Suwon-si (KR); Yoon Sung Lee, Suwon-si (KR); Tae-Hyun Kim, Incheon (KR); Kukjoo Lee, Incheon (KR); Junyoung Mun, Incheon (KR)

(73) Assignees: HYUNDAI MOTOR COMPANY, Seoul (KR); KIA MOTORS CORPORATION, Seoul (KR); INCHEON UNIVERSITY INDUSTRY ACADEMIC COOPERATION FOUNDATION, Incheon (KR)

( * ) Notice: Subject to any disclaimer, the term of this patent is extended or adjusted under 35 U.S.C. 154(b) by 132 days.

(21) Appl. No.: 16/038,054

(22) Filed: Jul. 17, 2018

(65) Prior Publication Data
US 2019/0173086 A1 Jun. 6, 2019

(30) Foreign Application Priority Data
Dec. 1, 2017 (KR) ........................ 10-2017-0163985

(51) Int. Cl.
*H01M 4/62* (2006.01)
*H01M 10/0525* (2010.01)
(Continued)

(52) U.S. Cl.
CPC ........... *H01M 4/622* (2013.01); *H01M 2/162* (2013.01); *H01M 2/1626* (2013.01); *H01M 4/133* (2013.01); *H01M 4/134* (2013.01); *H01M 4/386* (2013.01); *H01M 4/583* (2013.01); *H01M 10/0525* (2013.01); *H01M 2004/027* (2013.01); *H01M 2004/028* (2013.01)

(58) Field of Classification Search
CPC ..... H01M 2/162; H01M 2/1626; H01M 4/622
USPC ......................................... 429/217
See application file for complete search history.

(56) References Cited

U.S. PATENT DOCUMENTS

2012/0088155 A1* 4/2012 Yushin .................... H01M 2/16
429/217
2014/0234704 A1* 8/2014 Kamizori ............ H01M 10/052
429/200

* cited by examiner

*Primary Examiner* — James M Erwin
(74) *Attorney, Agent, or Firm* — McDonnell Boehnen Hulbert & Berghoff LLP

(57) ABSTRACT

Disclosed herein is a lithium secondary battery capable of improving an output characteristic, a life characteristic, and stability of electrode adhesion by using a binder containing dopamine-polymerized heparin in an anode containing silicon. In accordance with an aspect of the present disclosure, a lithium secondary battery includes: a cathode; an anode; a separation film disposed between the cathode and the anode; and an electrolyte, wherein the anode comprises a binder containing carboxymethyl cellulose (CMC), styrene-butadiene rubber (SBR), and polysaccharide including a sulfonate functional group and an amine group.

10 Claims, 6 Drawing Sheets

(51) Int. Cl.
*H01M 4/583* (2010.01)
*H01M 4/38* (2006.01)
*H01M 4/133* (2010.01)
*H01M 2/16* (2006.01)
*H01M 4/134* (2010.01)
*H01M 4/02* (2006.01)

LITHIUM SECONDARY BATTERY AND BINDER FOR ANODE OF THE LITHIUM SECONDARY BATTERY

CROSS-REFERENCE TO RELATED APPLICATION

This application is based on and claims priority under 35 U.S.C. § 119 to Korean Patent Application No. 10-2017-0163985, filed on Dec. 1, 2017, in the Korean Intellectual Property Office, the disclosure of which is incorporated by reference herein in its entirety.

BACKGROUND

1. Field

The present disclosure relates to a lithium secondary battery.

2. Description of Related Art

In general, a lithium secondary battery has a high operating voltage and high energy density compared to a lead battery or a nickel/cadmium battery by containing an electroactive material. Accordingly, the lithium secondary battery is widely used as energy storage means for Electric Vehicle (EV) and Hybrid Electric Vehicle (HEV).

The mileage of EV can be improved by densifying battery energy. In order to densify battery energy, the energy density of materials used in the battery needs to be improved.

The disclosure of this section is to provide background of the invention. Applicant notes that this section may contain information available before this application. However, by providing this section, Applicant does not admit that any information contained in this section constitutes prior art.

SUMMARY

Ni—, Co—, or Mn-based cathode can be used with a graphite anode in a lithium secondary battery. However, materials other than graphite can be considered to overcome limitations in energy density. Studies on silicon having large capacity exceeding 4000 mAh/g and high energy density compared to graphite having capacity of 360 mAh/g are actively conducted.

An aspect of the present disclosure provides a lithium secondary battery capable of improving an output characteristic, a life characteristic, and stability of electrode adhesion by using a binder containing dopamine-polymerized heparin in an anode containing silicon.

Additional aspects of the disclosure will be set forth in part in the description which follows and, in part, will be obvious from the description, or may be learned by practice of the disclosure.

In accordance with an aspect of the present disclosure, a lithium secondary battery includes: a cathode; an anode; a separation film disposed between the cathode and the anode; and an electrolyte, wherein the anode comprises a binder containing carboxymethyl cellulose (CMC), styrene-butadiene rubber (SBR), and polysaccharide including a sulfonate functional group and an amine group.

The binder includes the CMC of 10 wt % or less (except for zero).

The binder includes the SBR of 10 wt % or less (except for zero).

The binder includes the CMC and the SBR of 10 wt % or less (except for zero).

The polysaccharide includes dopamine-polymerized heparin.

The binder includes dopamine-polymerized heparin of 20 wt % or less (except for zero).

The binder includes polysaccharide of 20 wt % or less (except for zero).

The anode includes graphite and silicon.

In accordance with an aspect of the present disclosure, a binder for an anode of a lithium secondary battery, comprising: carboxymethyl cellulose (CMC) of 10 wt % or less (except for zero); styrene-butadiene rubber (SBR) of 10 wt % or less (except for zero); and dopamine-polymerized heparin of 20 wt % or less (except for zero).

A total content of the CMC and the SBR is 10 wt % or less (except for zero).

A content of the CMC is 5 wt % or less (except for zero).
A content of the SBR is 5 wt % or less (except for zero).
A content of the dopamine-polymerized heparin is 10 wt % or less (except for zero).

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
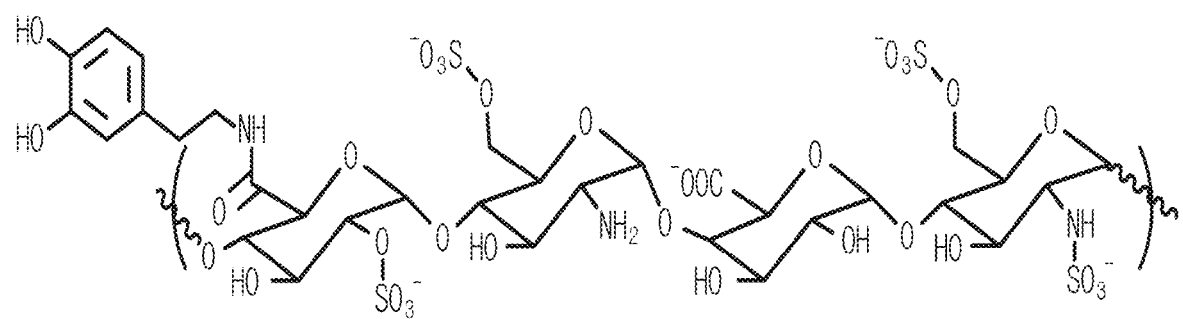
FIG. 1 shows dopamine-polymerized heparin according to a certain embodiment.

Like numbers refer to like elements throughout this specification. This specification may not describe all components of embodiments, and general information in the technical field to which the present disclosure belongs or overlapping information between embodiments will not be described.

Also, it will be understood that when the terms "includes," "comprises," "including," and/or "comprising," when used in this specification, specify the presence of a stated component, but do not preclude the presence or addition of one or more other components.

It is to be understood that the singular forms "a," "an," and "the" include plural referents unless the context clearly dictates otherwise.

An aspect of the present invention provides a binder compound for making a silicon-based anode of a lithium secondary battery. An anode of lithium secondary battery includes graphite and silicon as a base material, and further includes binder compounds. In embodiments, binder compounds comprise a water-based binder, at least one of arboxymethyl cellulose (CMC) and styrene-butadiene rubber (SBR) for binding graphite. In embodiments, the binder compounds further includes a heparin-based polymer binder for binding silicon in the anode and for suppressing volume expansion of the silicon-based anode.

Hereinafter, embodiments of the present disclosure will be described in detail with reference to the accompanying drawings and tables. First, a lithium secondary battery will be described, and then a binder according to an embodiment will be described.

Generally, a lithium secondary battery includes a cathode, an anode, a separation film, and an electrolyte. The cathode, the anode, and the separation film form an electrode structure, and are components typically used to manufacture a lithium secondary battery.

The electrode may include an electrode active material and a binder according to an embodiment. More specifically, the electrode according to an embodiment may be formed by applying electrode slurry formed by mixing an electrode active material, a binder, a solvent, and a conductive additive (as necessary) to a predetermined thickness on an electrode current collector, and then drying and rolling the electrode slurry. The binder may be a binder for anode, which will be described in detail, later.

An anode active material which is used to manufacture an anode may be an arbitrary anode active material that can insert and separate lithium ions. The anode active material may be any one or a combination of two or more selected from among a group composed of a material capable of reversibly absorbing and separating lithium, a metal material capable of alloying with lithium, and a mixture thereof. The material capable of reversibly absorbing and separating lithium may be at least one material selected from among a group composed of synthetic graphite, natural graphite, graphitized carbon fiber, graphitized mesocarbon microbead, fullerene, and amorphous carbon. The amorphous carbon may be hard carbon, coke, MCMB and MPCF fired at 1500° C. or lower, or the like. Also, the metal material capable of alloying with lithium may be at least one metal selected from among a group composed of Al, Si, Sn, Pb, Zn, Bi, In, Mg, Ga, Cd, Ni, Ti, Mn, and Ge. The metal materials may be used alone, mixed with each other, or alloyed with each other. Also, the metal materials may be used as a compound mixed with a carbon-based material.

According to the current embodiment, the anode active material may be a compound of a graphite-based anode active material and a silicon (Si)-based anode active material. The Si-based anode active material may expand excessively upon charging or discharging to influence adhesion of the binder, resulting in a reduction of the life characteristic, although it has high capacity. However, the binder according to the current embodiment may solve the problem to provide a lithium ion battery that is excellent in view of an output characteristic, a life characteristic, and stability of electrode adhesion.

The Si-based anode active material includes silicon oxide, silicon particles, silicon alloy particles, etc. Representative examples of the alloy include a solid solution of aluminium (Al), manganese (Mn), iron (Fe), titanium (Ti), etc. alloyed with a silicon element, an intermetallic compound, a eutectic alloy, etc., although not limited to these.

A cathode active material that is used to manufacture a cathode, according to an embodiment, may include a compound allowing reversible intercalation and deintercalation of lithium. More specifically, the cathode active material may be at least one of composite oxides of lithium and a metal selected from among cobalt, manganese, nickel, and a combination thereof.

The electrode according to the current embodiment may further contain other additives, such as dispersion medium, a conductive additive, a viscosity modifier, and a filling material, in addition to the electrode active material and the binder described above.

The separation film may prevent a short circuit between the cathode and the anode, and provide a passage of lithium ions. The separation film may be a polyolefin-based polymer film including polypropylene, polyethylene, polyethylene/polypropylene, polyethylene/polypropylene/polyethylene, and polypropylene/polyethylene/polypropylene, a multi-layer film thereof, a microporous film, fabric, and non-woven fabric, which are well-known in the related art. Also, a microporous polyolefin film coated with a resin having high stability may be used. If the electrolyte is a solid electrolyte such as polymer, the solid electrolyte may function as the separation film.

The electrolyte may contain lithium salt and a non-aqueous organic solvent, and further contain an additive for improving the charging/discharging characteristic and preventing overcharging. The lithium salt may be, for example, a mixture of one or more materials selected from among a group composed of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI) and $(CF_3SO_2)_2NLi$.

The non-aqueous organic solvent may be carbonate, ester, ether, or ketone, which can be used alone or in combination. The carbonate may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), prophylene carbonate (PC), buthylene carbonate (BC), fluoroethylene carbonate (FEC), vinylene carbonate (VC), etc., the ester may be γ-butyrolactone (GBL), n-methyl acetate, n-ethyl acetate, n-propyl acetate, etc., and the ether may be debutyl ether, although not limited to these.

Also, the non-aqueous organic solvent may further contain an aromatic hydrocarbon organic solvent. Examples of the aromatic hydrocarbon organic solvent may be benzene, fluorobenzene, bromobenzene, chlorobenzene, cyclohexylbenzene, isopropyl benzene, n-butylbenzene, octyl benzene, toluene, xylene, mesitylene, etc., which can be used alone or in combination.

Hereinafter, a binder for an anode of a lithium secondary battery, according to an embodiment, will be described in detail. In the following description, one unit is weight % (wt %), unless specifically noted.

The binder according to the current embodiment may contain carboxymethyl cellulose (CMC), styrene-butadiene rubber (SBR), and polysaccharide including a sulfonate functional group and an amine group. The binder can use heparin or dopamine-polymerized heparin as the polysaccharide including the sulfonate functional group and the amine group. However, the binder may preferably use dopamine-polymerized heparin.

The lithium secondary battery according to the current embodiment may include a compound of graphite and silicon as an anode, and include a binder in which a water-based binder CMC/SBR used in a graphite-based anode is mixed with a heparin-based polymer binder for increasing adhesion strength of a silicon-based anode and suppressing volume expansion of the silicon-based anode, in order to improve the adhesion of the anode including the compound of graphite and silicon.

The lithium secondary battery according to the current embodiment may include silicon having higher energy density than graphite as a material for anode, in order to increase energy density. However, silicon has a problem that the volume expands during charging or discharging. Silicon expands about four times in volume when it is charged to $Li_{4.4}Si$, which causes secession and cracks of an electrode, which may threaten the stability of the electrode, as well as the lifecycle of the electrode. Therefore, the current embodiment may provide a lithium secondary battery including a compound of graphite and silicon as the anode by including, as a binder, heparin polymerized with dopamine, together with CMC/SBR, to suppress the volume expansion of silicon.

The binder according to the current embodiment may include CMC, and CMC may be used for surface dispersion of graphite and water when water-soluble slurry is manufactured with graphite. The binder according to the current embodiment may contain CMC of 10 wt % or less (except for zero), more preferably, 5 wt % or less (except for zero). If a CMC content deviates from the above-mentioned range, the energy density of the anode may be reduced, or slurry may be hardened so that the slurry is not properly mixed. Accordingly, a CMC content included in the binder may be preferably within the above-mentioned range.

The binder according to the current embodiment may include SBR, and SBR may be a binder for binding graphite, a conductive additive, a current collector, etc. The binder according to the current embodiment may contain SBR of 10 wt % or less (except for zero), more particularly, 5 wt % or less (except for zero). If a SBR content deviates from the above-mentioned range, the energy density of the anode may be reduced, or slurry may be hardened so that the slurry is not properly mixed. Accordingly, a SBR content included in the binder may be preferably within the above-mentioned range.

The CMC and SBR described above may be included together in the binder according to the current embodiment, and the total content may be preferably 10 wt % or less (except for zero).

The binder according to the current embodiment may include dopamine-polymerized heparin of 20 wt % or less (except for zero), more particularly, 10 wt % or less (except for zero). If the dopamine-polymerized heparin content deviates from the above-mentioned range, the energy density of the anode may be reduced, or the lifecycle of the electrode may be reduced, so that the anode may be separated from the current collector or broken. Accordingly, a dopamine-polymerized heparin content included in the binder may be preferably within the above-mentioned range.

In embodiments, electrode active material, the conductive additive, and the binder compounds are mixed at a weight ratio of 8:1:1 to form the anode. In embodiments, the binder compounds for anode includes the dopamine-polymerized heparin in an amount ranging from 1.0, 2.0, 3.0, 4.0, 5.0, 6.0, 7.0, 8.0, 9.0, 9.1, 9.3, 9.5, 9.7, 9.9, 9.95, 10.0, 10.05, 10.1, 10.15, 10.2, 10.5, 11.0, 12.0, 13.0, 14.0, 15.0, 16.0, 17.0, 18.0, 19.0 and 20.0 wt %. In embodiments, the amount of dopamine-polymerized heparin is in a range formed by any two numbers selected from those listed in the proceeding sentence.

In embodiments, the anode includes the dopamine-polymerized heparin in an amount ranging from 0.1, 0.2, 0.3, 0.4, 0.5, 0.6, 0.7, 0.8, 0.9, 0.91, 0.93, 0.95, 0.97, 0.99, 0.995, 1.0, 1.005, 1.01, 1.015, 1.02, 1.05, 1.1, 1., 1.3, 1.4, 1.5, 1.6, 1.7, 1.8, 1.9, 2.0, 3.0, 4.0, 5.0, 6.0, 7.0, 8.0, 9.0, 9.1, 9.3, 9.5, 9.7, 9.9, 9.95, 10.0, 10.05, 0.1, 10.15, 10.2, 10.5, 11.0, 12.0, 13.0, 14.0, 15.0, 16.0, 17.0, 18.0, 19.0 and 20.0 wt %. In embodiments, the amount of dopamine-polymerized heparin is in a range formed by any two numbers selected from those listed in the proceeding sentence.

Heparin includes a plurality of sites allowing hydrogen binding or covalent binding with CMC, which may function as a cross-linker. Also, a functional group $SO_3$- has an advantage that it can help the transfer of lithium ions. Also, since a catechol functional group of dopamine has a strong adhesion force with a silicon material, a physically improved adhesion force may be provided by polymerizing dopamine with heparin.

Hereinafter, a method of synthesizing the dopamine-polymerized heparin polymer according to the current embodiment, and a method of manufacturing the electrode of the lithium secondary battery will be described.

First Embodiment

The first embodiment is to graft dopamine onto heparin through graft polymerization, in order to polymerize dopamine with heparin. In order to synthesize dopamine-polymerized heparin, distilled heparin of 1.0 g may be melted in a phosphate buffer solution (PBS 100 ml) of pH6, and then stirred. Thereafter, 1-Ethyl-3-(3-dimethylaminopropyl) carbodiimide) (EDC) of 1.63 g and N-Hydroxysuccinimide (NHS) of 0.98 g may be melted in a PBS solution of pH6, and then mixed with the solution in which the heparin is melted. A dopamine solution of 0.5 g may be dissolved in the mixed solution, and then the dissolved solution may be stirred at room temperature for 9 hours. After the reaction has finished, a cellulose membrane (MWCO=12 kDa) may be used to purify the mixed solution with distilled water, and then the purified solution may be freeze-dried to thereby synthesize dopamine-polymerized heparin. The synthesized dopamine-polymerized heparin polymer can be expressed by chemical formula shown in FIG. 1, and as shown in FIG. 2, a UV-vis spectrometer may be used to check synthesis of the dopamine-polymerized heparin.

Figure 2:
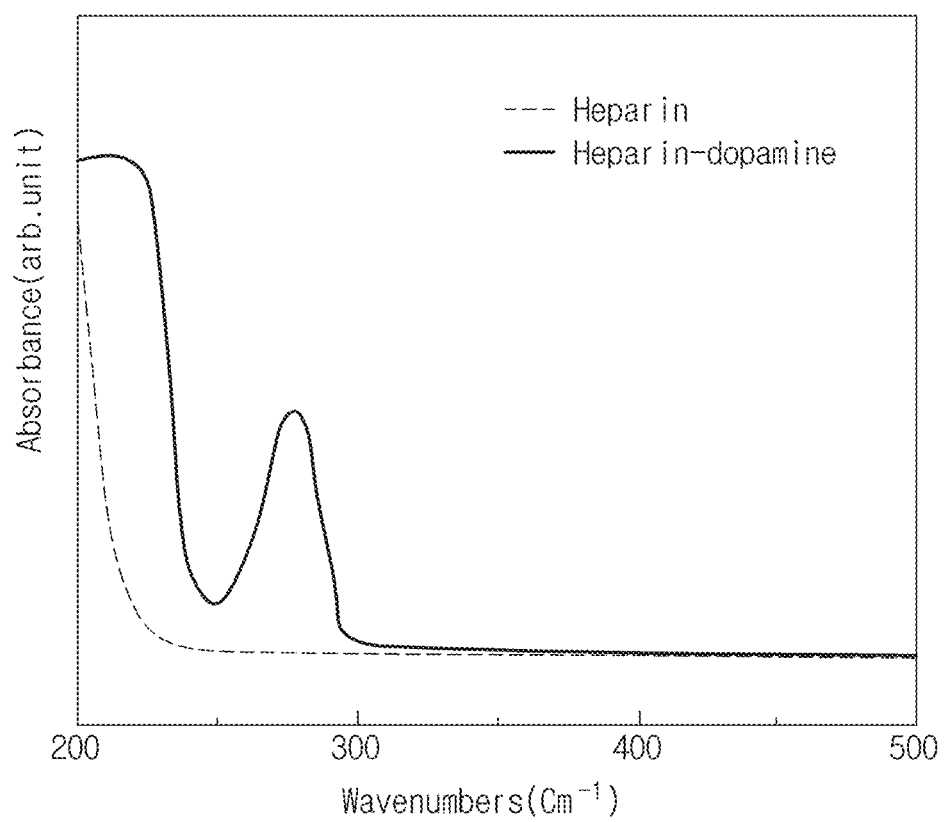
FIG. 2 shows the absorbance of dopamine and dopamine-polymerized heparin.

As shown in FIG. 2, when only heparin is melted in distilled water and then checked with the UV-vis spectrometer, no peak has been detected at 280 nm which is the absorption wavelength of dopamine. Meanwhile, in the case of the dopamine-polymerized heparin synthesized according to the first embodiment, a peak has been detected at 280 nm which is the absorption wavelength of dopamine, and accordingly, synthesis of dopamine-polymerized heparin can be verified.

Second Embodiment

The second embodiment is to manufacture an anode using the dopamine-polymerized heparin synthesized according to the first embodiment. According to the second embodiment, a primary binder composed of an electrode active material in which graphite and silicon oxide are mixed at a ratio of 93:7, a carbon black conductive additive, and CMC+SBR of 2.9 wt % may be dispersed in distilled water to prepare slurry. Dopamine-polymerized heparin of 0.1 wt %, which is a secondary binder, may be added in the prepared slurry to produce electrode slurry. The electrode active material, the conductive additive, and the binder may be prepared at a ratio of 8:1:1, and the binder may be prepared by mixing the dopamine-polymerized heparin, CMC, and SBR at a ratio of 0.1:0.9:2. Then, the electrode slurry may be applied to a thickness of 80 mm on a copper foil which is a current collector, by a comma coater method. After the electrode slurry is applied, the electrode slurry may be dried at temperature of 80° C., thereby manufacturing an anode for a lithium secondary battery.

Figure 3:
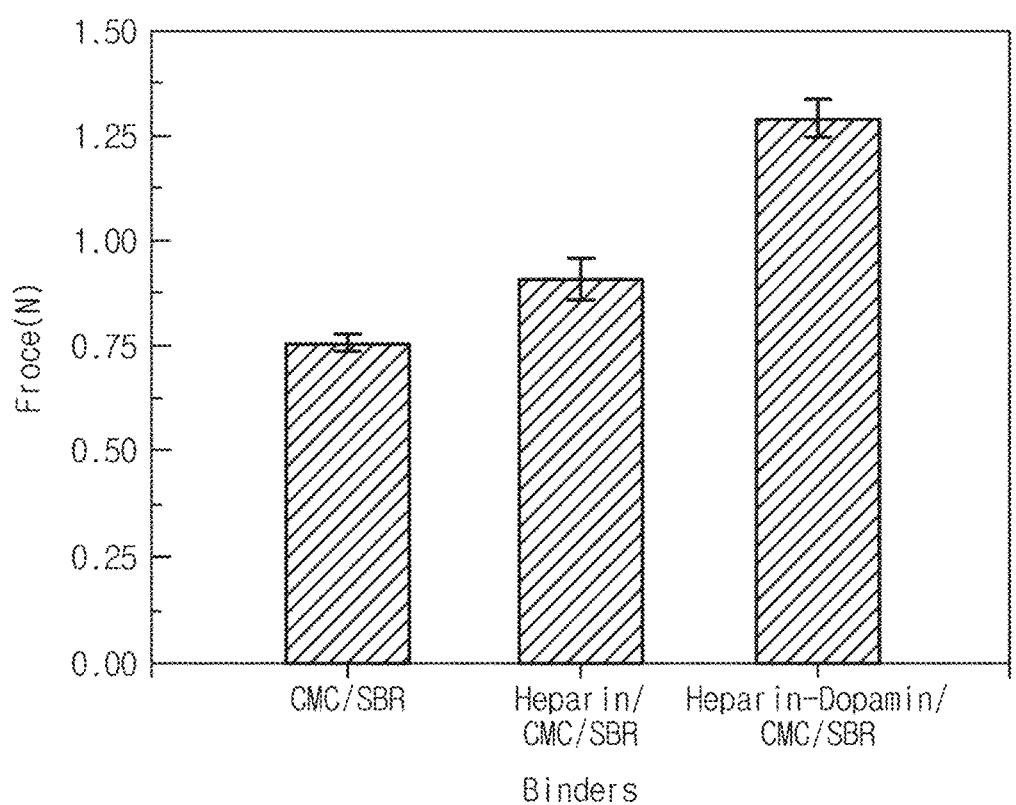
FIG. 3 shows results obtained by performing a peel-off test on the anode manufactured according to an embodiment.

FIG. 3 shows results obtained by performing a peel-off test on the anode manufactured according to embodiment. It can be seen in FIG. 3 that the anode manufactured with the binder in which dopamine-polymerized heparin is used together with CMC/SBR has higher peel-off strength than an anode manufactured with a binder having no dopamine-polymerized heparin. That is, it can be verified that when a dopamine-polymerized heparin polymer is used in a binder, an adhesion force of the electrode is improved.

Figure 4:
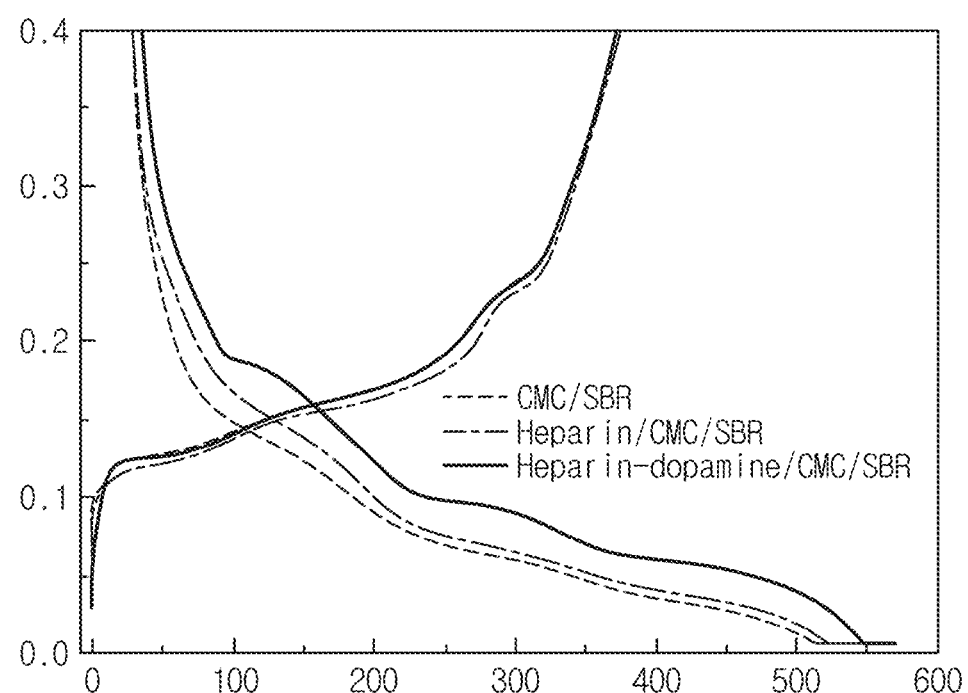
FIG. 4 shows evaluation profiles for charging/discharging of initial constant current of anodes according to the kinds of binders.

FIG. 4 shows evaluation profiles for charging/discharging of initial constant current of anodes according to the kinds of binders. FIG. 4 shows initial cycle voltage profiles obtained at 0.05 C between 0.005 and 2V (vs Li/Li+). As shown in FIG. 4, the anode manufactured with the binder in which dopamine-polymerized heparin is used together with CMC/SBR shows smallest resistance upon lithiation compared to the anode manufactured with the binder having no dopamine-polymerized heparin. This means that the binder suppresses an increase in volume of a silicon material during charging, while reducing resistance.

Figure 5:
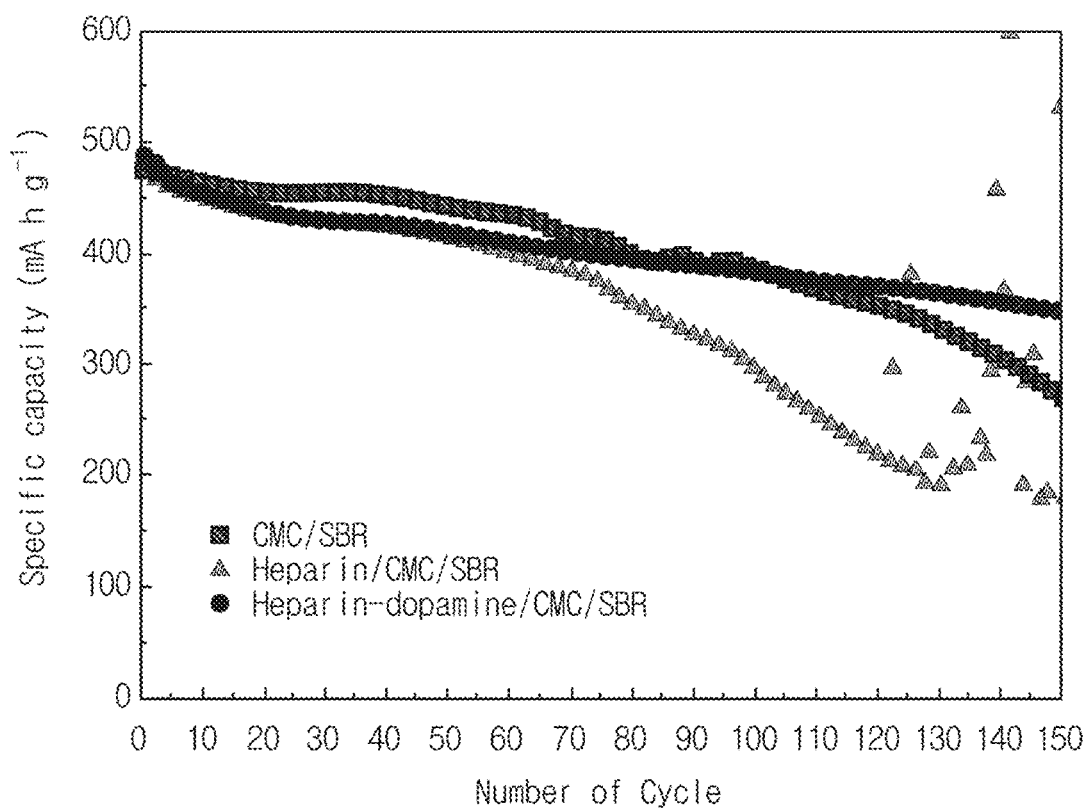
FIG. 5 shows cycle performance profiles of anodes according to the kinds of binders.

FIG. 5 shows cycle performance profiles of anodes according to the kinds of binders. As shown in FIG. 5, the anode manufactured with the binder in which dopamine-polymerized heparin is used together with CMC/SBR has $150^{th}$ cycle retention of 71.5% to show the most stable performance compared to the anode manufactured with the binder having no dopamine-polymerized heparin.

Figure 6:
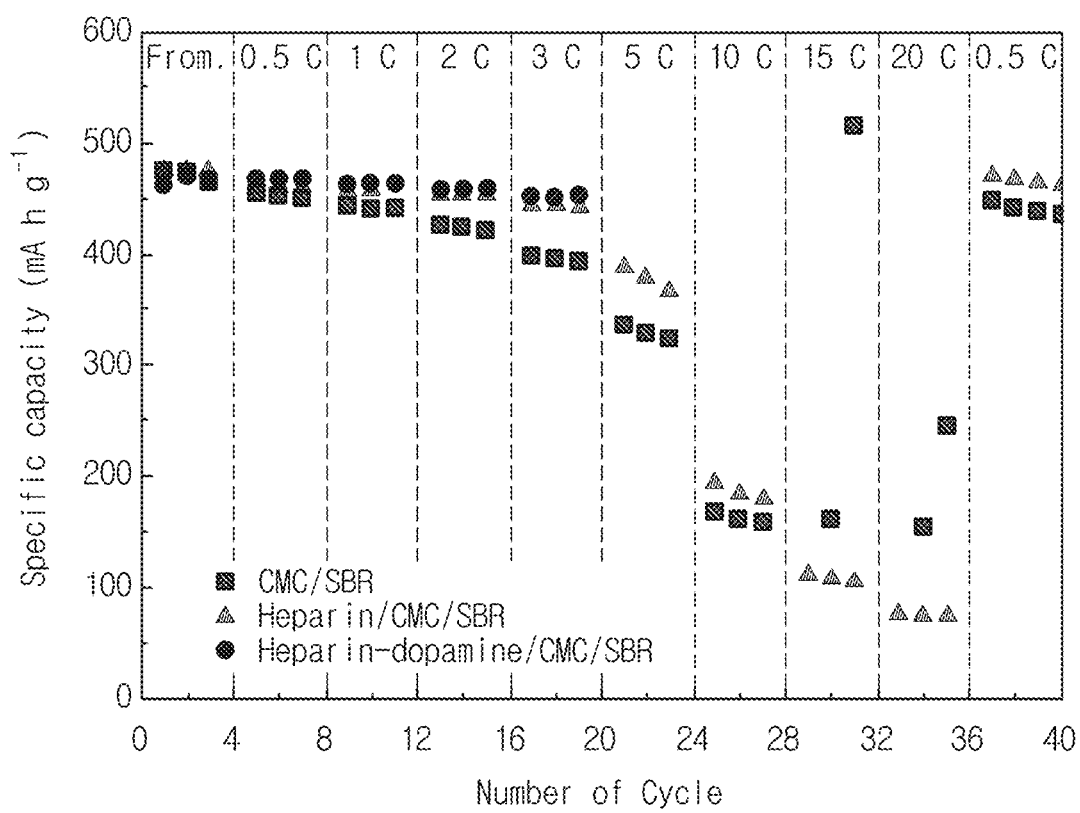
FIG. 6 shows discharge cycle performances of anodes according to the kinds of binders.

FIG. 6 shows discharge cycle performances of anodes according to the kinds of binders.

FIG. 6 shows discharge cycle performances of anodes having different binders at discharge C rates ranging from 0.5 C to 20 C. As shown in FIG. 6, the anode manufactured with the binder in which dopamine-polymerized heparin is used together with CMC/SBR shows more excellent rate performance than the anode manufactured with the binder having no dopamine-polymerized heparin. Accordingly, it can be determined that a sulfonate functional group of dopamine-polymerized heparin helps the diffusion of lithium ions so that an electrode using dopamine-polymerized heparin shows more excellent performance than an electrode using no dopamine-polymerized heparin.

Therefore, the binder according to the current embodiment may be excellent in view of an output characteristic, a life characteristic, and stability of electrode adhesion.

Also, the binder according to the current embodiment can suppress the volume expansion of silicon in a complex electrode of graphite and silicon.

Also, the binder according to the current embodiment can improve the ion conductivity of lithium ions.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A lithium secondary battery comprising:
   a cathode;
   an anode;
   a separation film disposed between the cathode and the anode; and
   an electrolyte,
   wherein the anode comprises a binder containing carboxymethyl cellulose (CMC), styrene-butadiene rubber (SBR), and the below chemical compound (1) of more than 0 wt % and 20 wt % or less (1).

2. The lithium secondary battery according to claim 1, wherein the binder comprises the CMC of more than 0 wt % and 10 wt % or less.

3. The lithium secondary battery according to claim 1, wherein the binder comprises the SBR of more than 0 wt % and 10 wt % or less.

4. The lithium secondary battery according to claim 1, wherein the binder comprises the CMC and the SBR of more than 0 wt % and 10 wt % or less.

5. The lithium secondary battery according to claim 1, wherein the anode comprises graphite and silicon.

6. A binder for an anode of a lithium secondary battery, comprising:
   carboxymethyl cellulose (CMC) of more than 0 wt % and 10 wt % or less;
   styrene-butadiene rubber (SBR) of more than 0 wt % and 10 wt % or less; and
   the below chemical compound (1) of more than 0 wt % and 20 wt % or less (1).

7. The binder according to claim 6, wherein a total content of the CMC and the SBR is more than 0 wt % and 10 wt % or less.

8. The binder according to claim 6, wherein a content of the CMC is more than 0 wt % and 5 wt % or less.

9. The binder according to claim 6, wherein a content of the SBR is more than 0 wt % and 5 wt % or less.

10. The binder according to claim 6, wherein a content of the chemical compound (1) is more than 0 wt % and 10 wt % or less.

* * * * *